United States Patent [19]

Gorra et al.

[11] Patent Number: 4,718,439

[45] Date of Patent: Jan. 12, 1988

[54] VEHICLE WASHING SYSTEM HAVING APPARATUS FOR FOLLOWING A VEHICLE SURFACE CONTOUR

[75] Inventors: William Gorra, Bolton; Kenneth J. O'Neil, Manchester; Jeffrey S. Dawson, Granby, all of Conn.

[73] Assignee: Syndet Products, Inc., Manchester, Conn.

[21] Appl. No.: 805,347

[22] Filed: Dec. 4, 1985

[51] Int. Cl.⁴ ................................................ B60S 3/04
[52] U.S. Cl. .................................. 134/57 R; 118/323; 118/680; 134/123; 134/181
[58] Field of Search ...................... 134/45, 57 R, 58 R, 134/123, 180, 181; 15/DIG. 2; 118/323, 679, 680, 681, 697

[56] References Cited

U.S. PATENT DOCUMENTS

| | | | |
|---|---|---|---|
| 3,196,888 | 7/1965 | Rousseau | 134/45 |
| 3,410,284 | 11/1968 | Burger | 134/123 X |
| 3,533,422 | 10/1970 | Alimanestiano | 118/679 X |
| 3,559,659 | 2/1971 | Gougoulas | 134/45 |
| 3,989,003 | 11/1976 | Fagan et al. | 118/697 X |
| 4,421,800 | 12/1983 | Schoenberg et al. | 118/679 X |
| 4,562,848 | 1/1986 | Messing et al. | 134/123 |

FOREIGN PATENT DOCUMENTS 2164498 7/1973 Fed. Rep. of Germany ...... 134/123

*Primary Examiner*—Philip R. Coe
*Attorney, Agent, or Firm*—McCormick, Paulding & Huber

[57] ABSTRACT

A vehicle washing system having apparatus for following the surface contour of a vehicle includes a redirectable directional discharge manifold assembly for a cleaning solution that is supported by an overhead, pivotally mounted boom at a washing station. Sensors mounted in the region of the manifold assembly sense the contour of the passing vehicle and a controller responsive to the sensor provides drive signals which activate a motor to move the boom and maintain the boom and manifold assembly at a predetermined distance relative to the vehicle as the vehicle passes the washing station.

17 Claims, 8 Drawing Figures

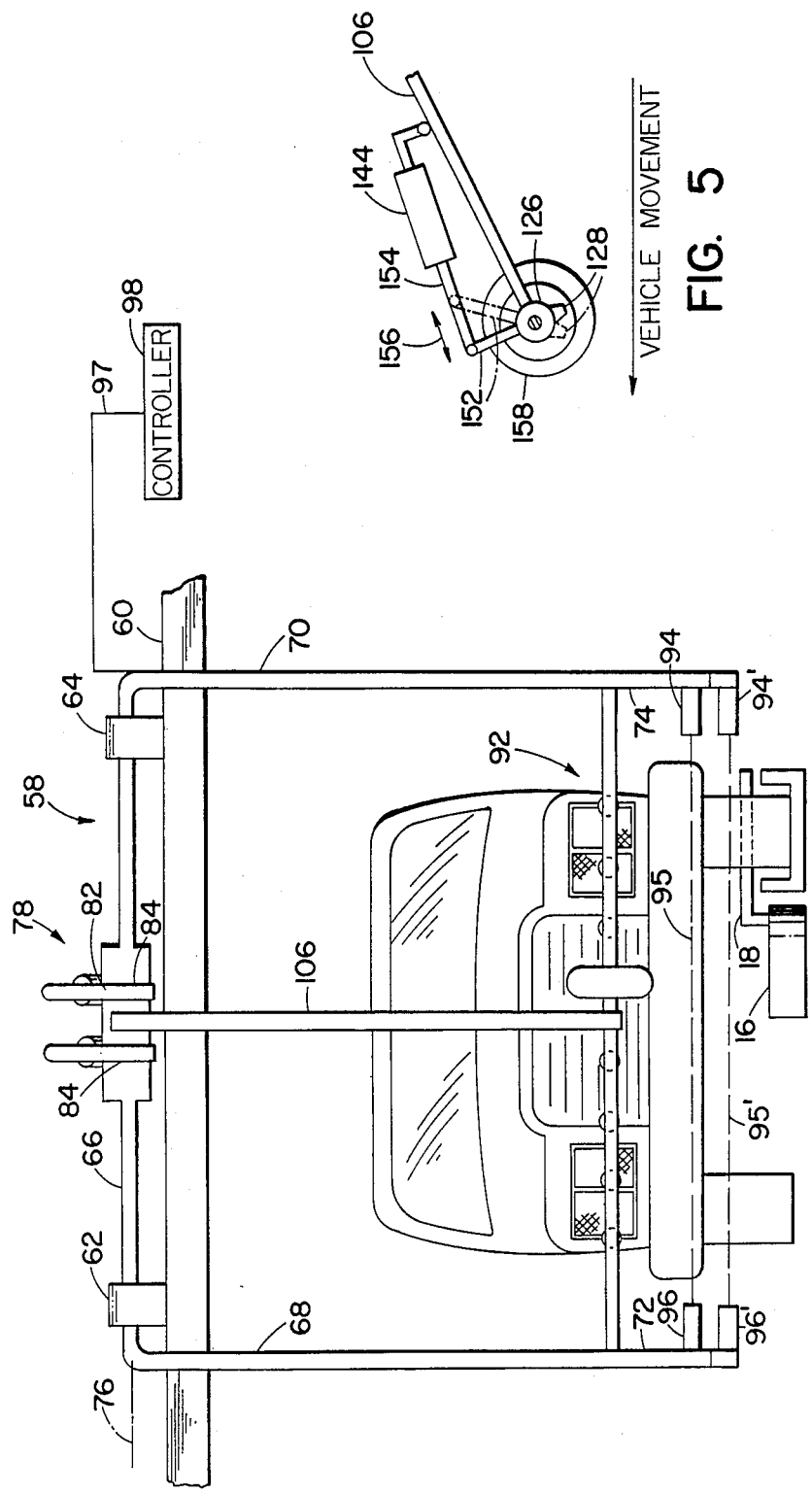

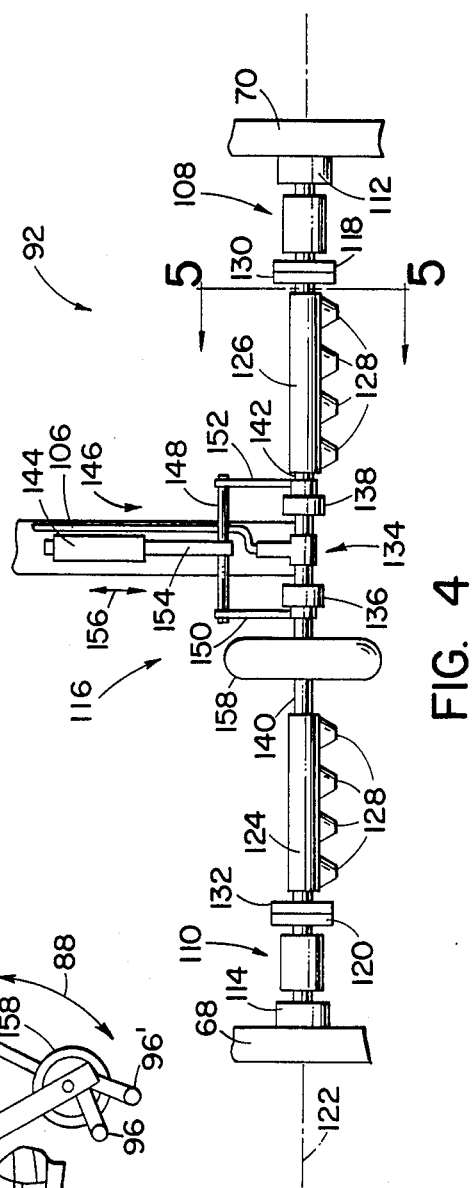
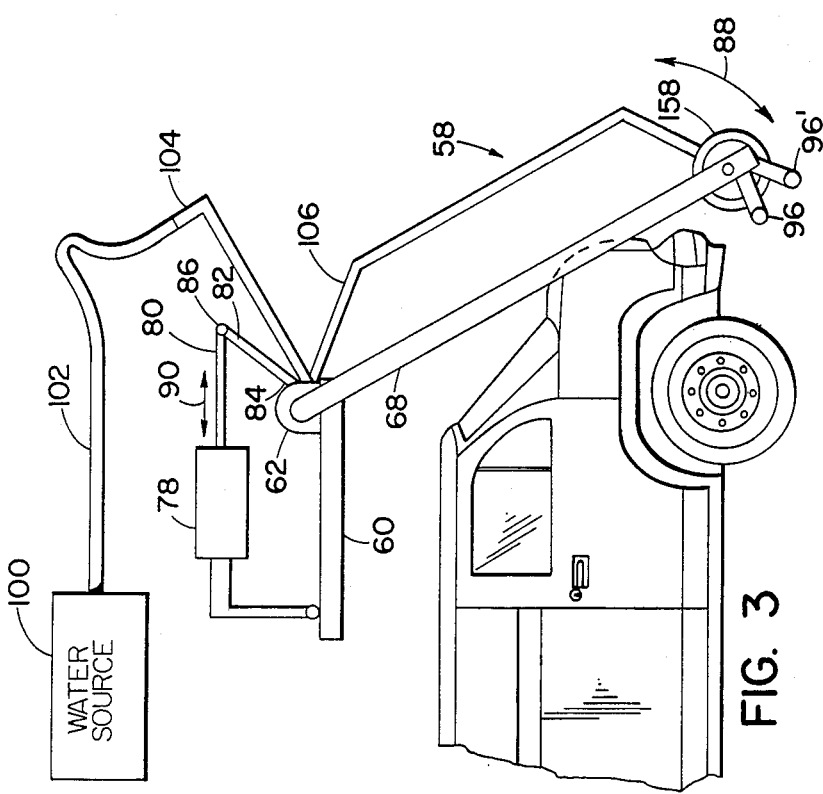
FIG. 4
FIG. 3

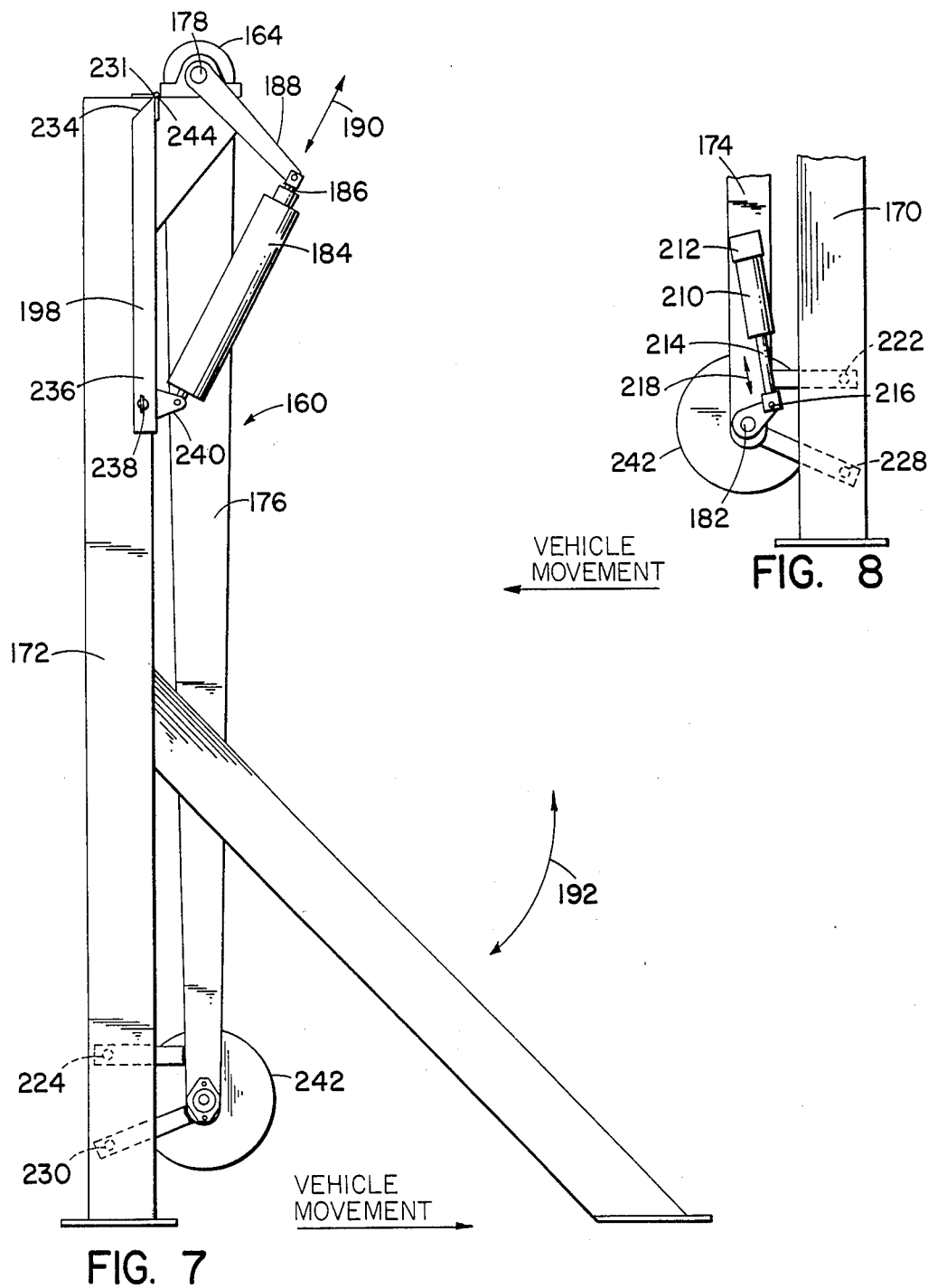

VEHICLE WASHING SYSTEM HAVING APPARATUS FOR FOLLOWING A VEHICLE SURFACE CONTOUR

BACKGROUND OF THE INVENTION

The present invention relates generally to apparatus for cleaning the exterior of a vehicle such as, an automobile, truck, van and the like and deals more particularly with a vehicle washing system having apparatus for following a vehicle surface contour at a predetermined distance without touching the surface.

Apparatus for cleaning the exterior of a vehicle is generally well known in the art and may include contact or friction types, contactless types or a combination of the two. Friction-type vehicle cleaning apparatus often use brushes, cloths, etc. as a cleaning element wherein the element is moved relative to and in contact with the vehicle surface to agitate a cleaning solution previously applied to the surface and loosen dirt or other contaminants. The contactless type of vehicle cleaning apparatus generally applies a chemical solution or detergent under high pressure to the surface of a vehicle to dislodge dirt and contaminants. Generally, in both types of systems, after a cleaning solution of some type is applied, the vehicle is moved relative to a rinsing station wherein water or a rinsing solution is pressure sprayed onto the surface of the vehicle to carry away the loosened dirt, contaminants and cleaning solution.

A problem often associated with both the contact and contactless types of vehicle cleaning apparatus is that the rinsing station structure is generally of a fixed width and height and therefore, the system design parameters are often selected to provide a compromise rinsing spray pattern that is at best only suitable for rinsing an average sized vehicle. Consequently, a smaller-than-average sized vehicle passing through a rinsing station of this type will generally have its surfaces too far from the rinsing spray source so that the rinse spray loses its surface impact pressure and the dirt and cleaning solution may not be adequately removed. In contrast, if the vehicle surface is too close to the rinsing spray source as might be the case with a larger-than-average sized vehicle, the subtended angle of the spray pattern narrows the area of surface contact in comparison to a surface that is located further from the source so that the effective rinsing surface coverage area is reduced and often results in inadequate removal of the dirt and cleaning solution from the surface.

One solution known in the art is to have a washing, rinsing or drying element arranged in some way to cooperate with a wheel that rides along the vehicle surface to maintain the element in a fixed position with respect to the surface. A vehicle washing device using a surface contacting wheel to follow the vehicle contour is exemplified in U.S. Pat. No. 3,196,888, issued July 27, 1965, to Rousseau. A disadvantage of the wheel type contour following devcie is that scratches or marring may occur on the surface as the wheel travels along the dirt covered surface.

Another washing mechanism, such as, exemplified in U.S. Pat. No. 3,533,422, issued Oct. 13, 1970, to Alimanestiano, uses a complex gantry structure that moves relative to a stationary vehicle. The gantry in turn has a transversely mounted wash bar that is raised and lowered in response to sensor signals to follow the vehicle contour. One disadvantage associated with the washing mechanism is that it is generally not suitable for use as a cleaning station in a vehicle cleaning line because vehicles cannot serially enter and exit the mechanism in a continuous fashion without subjecting the wash bar or structure to damage.

Another problem often associated with rinsing stations is that the nozzles used for spraying the rinsing solution are generally in a relatively fixed position with respect to the vehicle surface and cannot be easily aimed to spray in a direction that adequately rinses the grill and tail light areas; consequently, additional apparatus and equipment is often required to provide adequate rinsing of these areas.

It would be desirable, therefore, to provide a vehicle washing system having surface contour following apparatus that generally overcomes the problems associated with the aforesaid structures used in contact and contactless types of vehicle cleaning apparatus.

It is a general object of the present invention, therefore, to provide a contactless type vehicle contour following apparatus suitable for use in a cleaning station along a vehicle cleaning line.

It is a further object of the present invention to provide apparatus for following a vehicle surface contour wherein a cleaning element is maintained at a predetermined distance relative to the vehicle surface as the vehicle moves relative to the cleaning element so as to accommodate a number of different sized and shaped vehicles whereby the cleaning fluid surface contact coverage area is optimized for the vehicle passing through the cleaning station.

It is yet a further object of the present invention to provide a vehicle washing system that includes a cleaning element having a redirectable directional discharge to clean grill and tail light areas.

SUMMARY OF THE INVENTION

In accordance with a preferred embodiment of the invention, a vehicle washing system having apparatus for following the surface contour of a vehicle to be cleaned at a cleaning station in a vehicle cleaning line is presented. The washing system includes at least one cleaning station along the cleaning line at which a cleaning fluid is applied to the vehicle as part of the cleaning process. An overhead gantry located at the cleaning station and under which the vehicle travels when passing through the cleaning station supports a boom for pivotal movement about a pivot axis extending in a direction transverse to the cleaning line. A nozzle for dispensing the cleaning fluid is mounted on the boom at a point remote from the pivot axis for arcuate movement with the boom and provides a directional discharge of the cleaning fluid toward a passing vehicle.

The invention further resides in contour sensing means connected with the boom for controlling the pivotal movement of the boom and the dispensing nozzle relative to the vehicle to maintain the nozzle at a predetermined position or distance relative to the vehicle surface.

The invention also resides in nozzle rotating means connected with the boom and the nozzle for redirecting the cleaning fluid directional discharge as the boom and nozzle follow the contour of the passing vehicle.

BRIEF DESCRIPTION OF THE DRAWINGS

Other features and advantages of the present invention will be readily apparent from the following written description of a preferred embodiment and the drawings forming a part thereof wherein:

FIG. 2 is a front, somewhat schematic view of the cleaning station apparatus of FIG. 1.

FIG. 3 is a schematic side view of the pivotally-supported boom structure and associated drive motor.

FIG. 4 is a schematic front view of the rotatable manifold assembly of the cleaning station apparatus of FIG. 2.

FIG. 5 is a side view of the manifold assembly and associated drive motor taken along the line 5—5 of FIG. 4.

FIG. 7 is a schematic side view of the pivotally supported boom structure and associated drive motor taken along the line 7—7 of FIG. 6.

FIG. 8 is a partial schematic side view of the manifold assembly rotating drive motor and linkage assembly taken along the line 8—8 of FIG. 6.

DETAILED DESCRIPTION OF THE PREFERRED EMBODIMENTS

Prior to describing a preferred embodiment of the invention, it is important to note that the invention may be used in a number of different type vehicle cleaning systems such as one having a vehicle conveyor for transporting a vehicle to be cleaned through a plurality of stations in a vehicle cleaning line or one in which the vehicle remains stationary and the cleaning system moves relative to the vehicle. The invention is described in the following exemplary illustration embodied in a high pressure rinsing station in a vehicle cleaning system having a vehicle conveyor for transporting a vehicle to be cleaned through a plurality of stations in a vehicle cleaning line and wherein the vehicle surface is cleaned without contact between the elements comprising the cleaning system and the vehicle surface.

Figure 1:
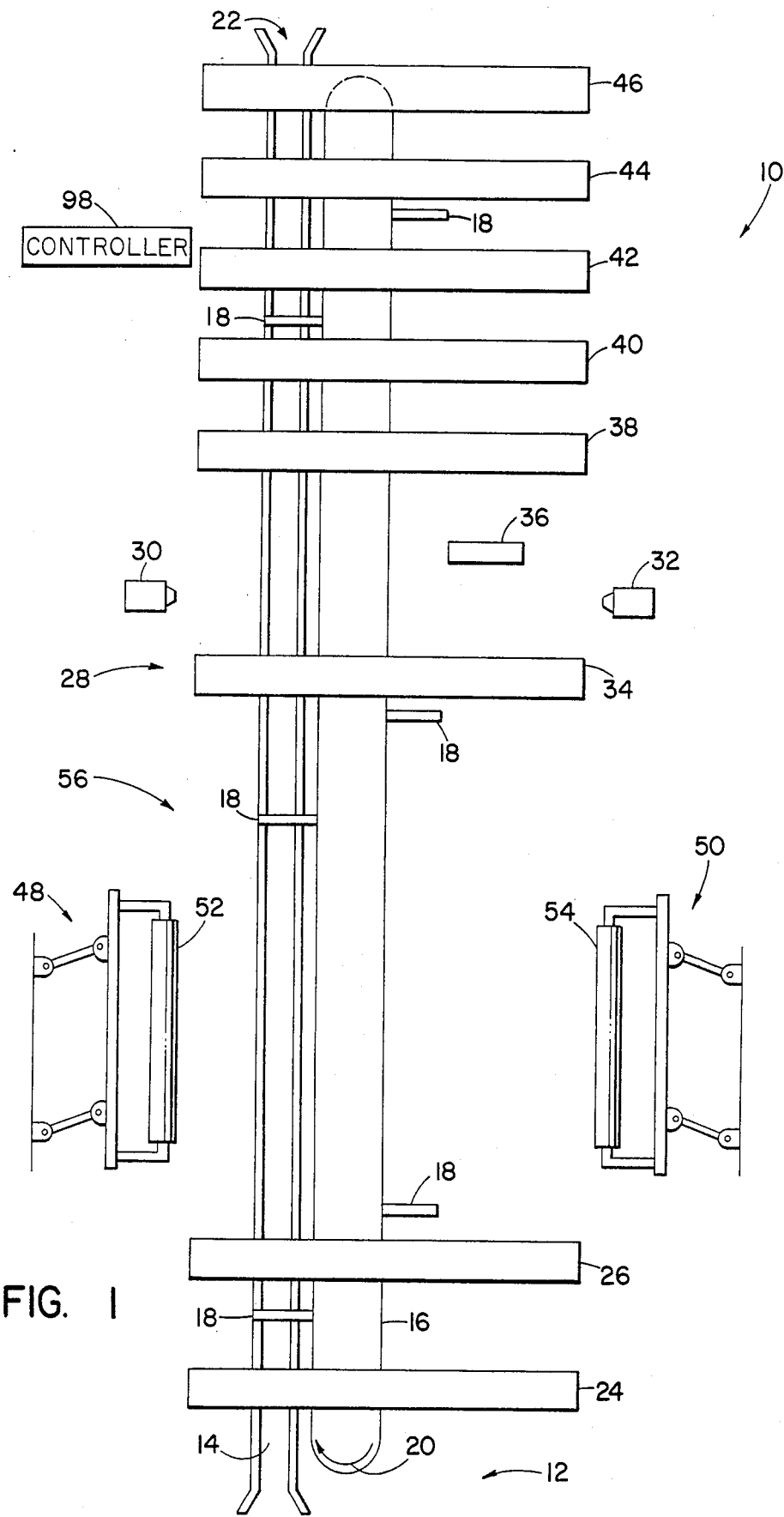
FIG. 1 is a diagrammatic plan view of a vehicle washing system including a cleaning station having apparatus embodying the present invention.

Turning now to the drawings and considering FIG. 1 in particular, a vehicle cleaning system of the type having a plurality of stations in a vehicle cleaning line is shown in a diagrammatic plan view and is designated 10. A vehicle to be cleaned is driven into a staging area designated 12 so that the wheels on one side of the vehicle are aligned with and follow a guide track 14 extending generally along the cleaning line. An endless conveyor 16 has a number of spaced apart flight bars 18,18 which move with the conveyor and in a direction shown by arrow 20 with the bars for the most part generally following a path parallel to the guide track 14. One of the bars 18 moves into position behind a vehicle's front wheel in the guide track 14 to propel the vehicle through one or more of the stations in the cleaning line. The bar 18 is moved out of contact with the wheel substantially at the terminal end 22 of the guide track 14 at which time the vehicle is driven away from the cleaning system.

Each of the stations along the cleaning line are activated to operate in a timed sequence in a manner generally well known to those skilled in the art. By way of example, a sensor (not shown) located in the staging area 12 and coupled to a controller 98 senses the front most portion of a passing vehicle and activates a counter in the controller to begin counting pulses. In response to the rear most portion of the vehicles passing the sensor, the controller instructs the counter to stop and the number of pulses counted represents the length of the vehicle. Since the vehicle moves along the path at a known velocity the controller calculates the time at which the vehicle will pass through each station and activates and de-activates the station at the proper time.

At the start of the cleaning process a vehicle is advanced through one or more cleaning solution dispensing stations 24,26 wherein an appropriate cleaning solution, preferably of the type having antistatic characteristics, is applied to the vehicle to loosen or break the static bond which holds dirt and contaminants to the vehicle surface.

The preferred cleaning solution generally requires a time period in which to act prior to being rinsed from the surface. The required period is achieved by locating a rinsing station 28 at a predetermined distance from the last dispensing station 26 so that the vehicle travel time from the dispensing station 26 to the rinsing station 28 is substantially equal to or greater than the period required for the solution to break the static bond between the dirt and contaminants and the surface.

The rinsing station 28 comprises vertical rinsing towers or arms 30, 32 having a number of serially arranged spray outlets or nozzles and a rinsing boom 34 to provide a directional discharge of cleaning fluid or rinse water toward a passing vehicle. The arms 30, 32 are located so that one arm is on one side of the cleaning line and the other arm is on the opposite side. The arms 30, 32 may also be arranged for movement toward and away from the vehicle sides to achieve a desired spacial relationship between the nozzles and the side surfaces of the vehicle as the vehicle passes through the rinsing station.

The vehicle is then advanced through a series of stationary, U-shaped arch structures which provide additional optional treatments to the vehicle surface as desired and may, for example, include a foam wax arch 38, a spray wax arch 40, a drying agent dispensing arch 42, a deionized water rinse dispensing arch 44 and a drying unit or blower 46.

The cleaning system 10 may also include a wheel cleaning station generally designated 56 of the type having a rotating wheel brush 52,54 associated with a respective wheel cleaning device 48,50 wherein the device is arranged to move in a direction parallel to the driving surface and into contact with the wheel and tire side wall of a vehicle in the station 56. The length of each of the brushes 52,54 is greater than the circumferential distance of a vehicle wheel and tire and each wheel and tire is cleaned by a respective one of the rotating brushes 52,54 as the vehicle advances along the cleaning path through the station 56.

Having generally described a vehicle cleaning system, a preferred embodiment of the invention is now disclosed and attention is directed to the rinsing station apparatus of FIGS. 2 and 3 wherein a boom generally designated 58 is shown supported for pivotal movement by supports 62, 64 fixedly mounted to an overhead structure or gantry 60. The boom 58 includes side members 68,70 each extending generally from the gantry 60 and each being of a sufficient length so that an associated end section 72,74 of a respective side member 68,70 is suspended within a range corresponding substantially to the vehicle's bumper and grill areas. A torque transmitting tube 66 is connected between the side members 68, 70 to move the boom wherein the boom is arranged to pivot about a transverse or pivot axis 76 extending coaxially along the center of the torque tube. A rotatable manifold assembly generally designated 92 and best viewed and described below in conjunction with FIG. 4 is connected at a point remote from the pivot axis 76, preferably between the end sections 72,74 and extends transversely substantially across the entire width of a vehicle to rinse the vehicle surface.

A motor, such as, an air or hydraulic cylinder 78 has one end fixedly connected to the gantry 60 and includes at its opposite free end a ram or piston rod 80 coupled to the torque transmitting tube 66 by a crank 82. The crank 82 has one end 84 fixedly attached to the torque tube 66 and a free end 86 connected to the ram 80 to convert linear motion of the ram to rotational motion of the boom 58. The end sections 72, 74 and the manifold assembly 92 move in a direction toward and away from a vehicle surface as indicated by arrow 88 when the ram 80 moves back and forth in a direction indicated by the arrow 90. Although a torque tube 66 is shown in the illustrative embodiment to transfer rotational movement from the motor 78 to the boom 58, other suitable arrangements for moving the boom may be used and one such arrangement is shown and described herein in conjunction with the disclosure of another embodiment of the invention illustrated in FIGS. 6 and 7.

Still considering FIGS. 2 and 3, an energy source, such as an infrared transmitter 94 and an associated sensor or detector 96 are supported in the vicinity of the manifold assembly 92. The transmitter 94 and sensor 96 are arranged opposite one another with the transmitter on one side of the cleaning line and the sensor on the other. When the transmitter 94 and sensor 96 are activated, a beam of energy generally designated 95 is generated transverse to the vehicle cleaning line. The location of the transmitter 94 and sensor 96 on the boom is such that when a beam 95 is established between them, the manifold assembly 92 is maintained at a desired predetermined spacial position or distance relative to the surface of a vehicle. The transmitter 94 and sensor 96 are coupled via a conductor 97 to a controller 98 which is responsive to an interruption in the beam 95 caused by a vehicle moving between the transmitter and the sensor. The energy beam 95 may be other than an infrared energy beam and may be established using suitable devices such as photoconductors which are well known to those skilled in the art.

Preferably, the transmitter 94 and sensor 96 are of the type designed for photoelectric sensing at long distances, at least the width of a vehicle, and through opaque objects such as water droplets that may be in the vicinity of the rinsing station and passing through the energy beam. Such a transmitter and sensor are manufactured by and available from Skan-A-Matic of Elbridge, N.Y. and are identified as Thrubeams Model L43/P43 Series. The transmitter and sensor are preferably arranged for light modulation and phase sensitive detection to provide ambient light immunity, increased beam penetration and nominal compensation for physically misaligned transmitter and sensor components.

The controller 98, in response to an interruption in the energy beam 95, causes an appropriate drive signal to be sent to the motor 78 to move the boom 58 and the transmitter 94 and sensor 96 mounted thereon to reestablish the beam 95 between the transmitter and sensor. The controller 98 is responsive to continuous interruptions in the beam 95 caused by the vehicle contour as the vehicle moves relative to the transmitter 94 and sensor 96. The appropriate drive signals are generated by the controller 98 and are sent to the motor 78. The motor 78 is responsive to the drive signals and moves the boom 58 and the manifold assembly 92 to follow the contour of the passing vehicle with the desired spacing between the assembly and the surface as the vehicle moves through the rinsing station.

An optional transmitter 94' and sensor 96' may be arranged and located on the boom 58 to establish a second beam 95' to provide better tracking of the vehicle contour in the vicinity of the rear portion of a passing vehicle. The second transmitter 94' and sensor 96' operate in parallel with transmitter 94 and sensor 96 so that the controller 98 is responsive to an interruption in either beam 95 or 95' to move the boom 58 and maintain the desired spacing between the manifold assembly 92 and the surface as the vehicle moves through the rinsing station.

A source 100 of rinse water or other cleaning fluid is coupled by a flexible hose or conduit 102 to an inlet assembly 104 located substantially midway between the side members 68, 70 of the boom 58 at the gantry end of the boom. The rinse water is supplied from the source 100 at a high pressure, preferably around 1600 pounds per square inch (psi). A bow-shaped conduit 106 is connected between the inlet 104 and the manifold assembly 92 to carry the rinse water from the source 100 to the manifold assembly. The conduit 106 is bow-shaped to allow a box-type vehicle, such as a van, to enter the rinsing station without the vehicle surface interferring with or contacting the boom 58 or the conduit 106 carrying the rinse water.

Turning now to FIGS. 4 and 5, the manifold assembly 92 includes end sections generally designated 108, 110 each having an associated outer end flange 112, 114 fixedly connected to a respective side member 70, 68. Each of the end sections 108, 110 is rotatably coupled to a rotatable center portion generally designated 116 of the assembly 92 by inner end flanges 118, 120, respectively. The flanges 118, 120 are in turn coupled to cooperating flanges 130, 132 which are connected to associated respective ends of the central portion 116 to permit the central portion 116 to rotate about an axis 122 extending transversely through the assembly 92 relative to the end sections 108, 110 and side members 68, 70.

A high pressure swivel assembly generally designated 134 is connected to one end of the bow-shaped conduit 106 and includes high pressure swivel couplings 136, 138 which are attached to inlet ends 140, 142 of manifold portions 124, 126, respectively. The manifold portions 124, 126 include a number of serially arranged outlets or nozzles 128, 128 to form a desired spray pattern. The spray pattern is selected to maximize the surface contact rinsing area at the predetermined spacing between the manifold assembly and vehicle surface.

A motor, such as an air cylinder or hydraulic motor, 144 is connected to an actuating assembly 146 to rotate the manifold portions 124, 126 about the axis 122. The directional discharge of the rinse water is redirected when the manifold portions 124, 126 are rotated by the assembly 146 as the boom 58 and manifold assembly 92 follow the contour of a passing vehicle. The assembly 146 includes a transverse actuating member 148 having each of its ends attached to one end of rods 150, 152. The opposite ends of rods 150, 152 are fixedly connected to the manifold portions 124, 126, respectively. The actuating member 148 is also coupled midway between its ends to one end of a piston rod or ram 154 associated with the motor 144. The motor moves the rod 154 back and forth as indicated by arrow 156 to rotate the manifold portions 124, 126 to redirect the directional discharge of the rinse water. The motor 144 is also coupled to the controller 98 and is responsive to command signals generated by and sent from the controller which is responsive to a sensor 36, such as, a trip switch on the floor of the car wash shown in FIG. 1 and described below The manifold portions 124, 126 initially discharge the rinse water generally toward the vehicle surface and the grill area as the vehicle enters the rinsing station to facilitate the rinsing of the grill and front bumper area. As the vehicle advances through the rinsing station the boom 58 and manifold assembly 92 follow the vehicle surface contour at the predetermined distance. The sensor 36 is located at a point along the vehicle travel path in the rinsing station so as to be activated by a front wheel as the rearward portion of the vehicle, generally beyond the rear window and corresponding to the trunk lid area, advances to the proximate region of the manifold assembly 92. The controller 98 is coupled to the sensor 36 and is sensitive to the activation of the sensor. The controller 98 sends a command signal to the motor 144 in response to the activation of sensor 36. The motor 144 is driven by the command signal and rotates the manifold portions 124, 126 to redirect the directional discharge to insure that dirt and contaminants are removed from rearwardly facing areas such as the tail lights, bumper, and trunk of the car. The controller 98 generates a reset signal after a vehicle has passed through the rinsing station and before the next vehicle in the vehicle cleaning line enters the rinsing station. The reset signal is sent to the motor 144 which rotates the manifold portions 124, 126 back to their initial discharge position.

In a preferred embodiment, rotation of the manifold portions 124, 126 is controlled on a timed basis, as disclosed above, by counting a number of pulses corresponding to the length of the vehicle as the vehicle enters the car wash and storing this information in the controller 98. The controller 98, in turn, sends a command signal to the motor 144 to rotate the manifold portions 124, 126 after a number of pulses, generally one-half the total number of pulses associated with a vehicle in the rinsing station, are counted from the time the vehicle enters the station. The rotation, therefore, occurs at approximately the mid-section of the passing vehicle. The controller 98 sends a command signal to the motor 144 to rotate the manifold portions to their initial position after all the pulses are counted for the vehicle in the station.

A safety wheel 158 is rotatably mounted and located generally in the central portion 116 of the manifold assembly 92. The wheel 158 is used to prevent the manifold assembly 92 from coming into contact with and damaging the vehicle surface in the event of a failure or malfunction in the transmitter 94, sensor 96, controller 98, motor 78, or other components that control the movement of the boom 58 and manifold assembly.

Figure 6:
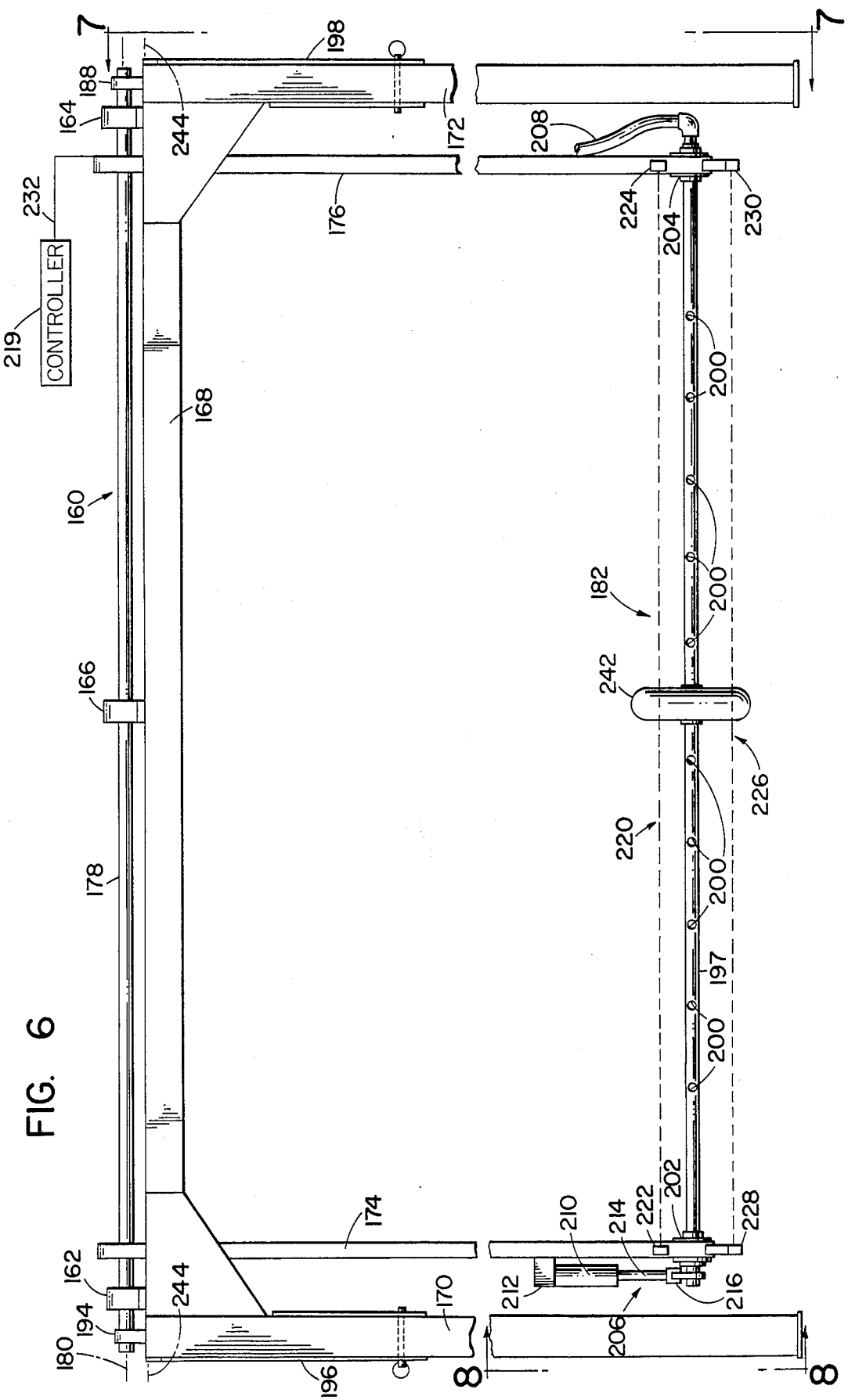
FIG. 6 is a rear, somewhat schematic view of another embodiment of the cleaning station apparatus of FIG. 1 and shows a schematic rear view of the rotatable manifold assembly.

Another embodiment of the invention is illustrated in FIGS. 6-8 wherein the rinsing station apparatus is shown in FIG. 6 as it would appear to a person sitting in a vehicle moving along the cleaning path. A boom generally designated 160 is shown supported for pivotal movement by end supports 162, 164 and a center support 166 fixedly mounted to an overhead gantry 168.

The gantry 168 is supported by vertical support members 170, 172. The vertical support members 170, 172 are spaced apart and opposite one another with one being located on one side of the cleaning path and the other on the other side of the cleaning path. The boom 160 includes side members 174, 176 each extending generally from the gantry 168 and a cross-member 178 fixedly attached to the side members 174, 176 at the gantry end, the cross-member being arranged to rotate in the supports 162, 164 and 166 about a pivot axis 180 extending coaxially along the cross-member. A rotatable manifold assembly generally designated 182 is connected at a point remote from the pivot axis 180, preferably between the end portions of the side members 174, 176 and extends transversely substantially across the entire width of the cleaning path to rinse the vehicle surface. In one embodiment, the support members 170, 172 are spaced ten feet apart and the manifold assembly 182 is positioned approximately 10.5 inches above the surface of the vehicle travel path.

A motor, such as, an air or hydraulic cylinder 184 is arranged for pivotal movement with respect to the vertical support member 172 and includes at its opposite end a ram 186 coupled to the boom cross-member 178 by a crank 188 fixedly connected at one end to the cross-member and pivotally connected at its opposite end to the ram to convert the linear motion of the ram indicated by arrow 190 to rotational motion of the boom 160. The end portions of the side members 174, 176 and the manifold assembly 182 move in a direction toward and away from the vehicle surface as indicated by arrow 192 when the ram moves back and forth in a direction as indicated by arrow 190. A similar motor arrangement located at the opposite side of the boom 160 and coupled between vertical support member 170 and the end of the cross-member 178 by a crank 194 operates in unison with the motor 184 to rotate the boom 160

The rotatable manifold assembly 182 includes a manifold 197 having nozzles 200, 200 for directing the discharge toward the surface of a vehicle passing through the rinsing station. The manifold is coupled between side member 174, 176 by high pressure swivels 202, 204 and extends through one member 174 and is coupled to an actuating mechanism 206 which operates, when commanded to do so to rotate the manifold assembly 182 to redirect the discharge. Rinse water is supplied to the manifold assembly 182 via a flexible hose 208 mounted along the member 176 and coupled between a high pressure water source (not shown) and the swivel 204.

The actuating mechanism 206 includes a motor, such as an air or hydraulic cylinder 210 coupled at one end 212 to the side member 174 and at its opposite free end via a ram 214 and a linkage member 216 to the end of the manifold assembly 182 protruding through the side member 174. The ram moves in the direction of arrow 218 in response to a signal from a controller 219 which activates the motor 210 to cause the ram to move to rotate the nozzle assembly.

An energy beam 220 is established across the cleaning path between a transmitting device 222 coupled to side member 174 and a sensor device 224 coupled to side member 176 in a similar arrangement as described above in conjuction with FIGS. 2 and 3 to detect the surface of a vehicle passing through the rinsing station. A second energy beam 226 is established between a transmitter 228 coupled to side member 174 and a sensor 230 coupled to side member 176 to provide more acurate tracking of the vehicle surface as explained above. The transmitter 222, 228 and sensors 202, 230 are coupled to the controller 219 via a conductor 232 and the controller 219 is responsive to the interruptions in the energy beam in much the same manner as the controller of FIG. 2 to maintain the manifold in a desired predetermined spacial position or distance relative to the vehicles surface.

Each vertical support member 170, 172 includes a breakaway member 196, 198 respectively and each breakaway member is hingedly coupled to the gantry 168. In FIG. 7, breakaway member 198 is shown connected by a hinge 231 at the hinged end 234 of the breakaway member and arranged for pivotal motion relative to its associated support member. The opposite end 236 of the breakaway member 198 is releasably held to its associated support member 172 by a shear pin 238 passing through a hole in the breakaway member and the support member. Alternately, a pressure release latching device may be used in place of the shear pin. The opposite end 236 of the breakaway member 198 also includes a pivotal mounting 240 for one end of the motor 184. The other breakaway member 196 located at the other side of the gantry is associated with the vertical support member 170 and the associated motor mounting, structure and operation parallels that of breakaway member 198 as illustrated and described above. The function of the breakaway members is to permit the boom to pivot when, for example, a runaway vehicle collides with a safety wheel 242 rotatably mounted on the manifold assembly 182. The breakaway member, motor and boom pivot about an axis 244 extending through the hinged portion of hinge 232 when the shear pin 238 shears due to the force applied to the boom by the runaway vehicle.

Apparatus for cleaning the exterior of a vehicle using an overhead boom having a cleaning assembly that follows the contour of a vehicle surface without contacting the surface has been described in a preferred embodiment. It will be understood, however, that numerous changes and modifications may be had without departing from the spirit of the invention. Therefore, the invention has been described by way of illustration rather than limitation.

We claim:

1. A vehicle washing system having a vehicle conveyor for transporting a vehicle to be cleaned through a plurality of stations in a vehicle cleaning line, said system comprising:
   at least one cleaning station along the cleaning line at which a cleaning fluid is applied to the vehicle as part of the cleaning process;
   an overhead gantry located along the cleaning line at the cleaning station and under which the vehicle travels when passing through the cleaning station;
   a boom mounted to the overhead gantry for pivotal movement about a pivot axis extending in a direction transverse to the cleaning line;
   nozzle defining means for dispensing the cleaning fluid mounted on the boom at a point remote from and in a fixed, spaced apart relation with the pivot axis for arcuate movement with the boom and providing a directional discharge of the cleaning fluid toward a passing vehicle;
   vehicle contour following means connected with the boom for controlling pivotal movement of the boom and the dispensing nozzle relative to the vehicle surface, said following means being spaced apart from and in a non-contacting relation with the vehicle surface and
   nozzle rotating means connected with the boom and the nozzle for redirecting the directional discharge as the boom and nozzle follow the contour of the passing vehicle.

2. A vehicle washing system as defined in claim 1 wherein the boom is disposed for limited pivotal movement at a side of the gantry downstream with respect to the direction of the vehicle movement by the conveyor.

3. A vehicle washing system as defined in claim 1 further including a trip switch for sensing the front wheel of the passing vehicle and for activating the nozzle rotating means to redirect the directional discharge of the cleaning fluid, the trip switch being located at a side of the gantry downstream with respect to the direction of vehicle movement by the conveyor.

4. A vehicle washing system as defined in claim 1 further including:
   means for determining the length of a passing vehicle, said vehicle length determining means including a sensor for initiating a pulse counting sequence when said sensor detects the approaching front profile of the vehicle and for stopping the counting sequence when the rear most profile of the vehicle passes the sensor, said number of counted pulses being representative of the vehicle length, and
   nozzle rotating responsive means sensitive to a predetermined pulse count and for activating the nozzle rotating means to redirect the directional discharge of the cleaning fluid when said predetermined pulse count is sensed.

5. A vehicle washing system as defined in claim 1 wherein the vehicle contour following means includes:
   means coupled to the boom in the vicinity of the nozzle for providing an energy beam transversely across the vehicle path;
   means for sensing an interruption in the energy beam by the contour of the passing vehicle, and
   motive means responsive to the beam sensing means for moving the boom to maintain the nozzle in a predetermined position relative to the vehicle.

6. A vehicle washing system as defined in claim 5 wherein the energy beam providing means includes:
   energy ray source means located on one side of the vehicle cleaning line for transmitting the energy rays across the vehicle path, and
   energy ray receiver means sensitive to the energy rays and located on the other side of the vehicle cleaning line opposite the energy source for receiving the rays whereby the energy beam is generated between the source means and the receiver means.

7. A vehicle washing system as defined in claim 6 wherein the source means is an infrared transmitting device.

8. A vehicle washing system as defined in claim 7 wherein the energy ray receiver means is an infrared receiving device.

9. A vehicle washing system as defined in claim 5 wherein the source means is a light modulated transmitting device.

10. A vehicle washing system as defined in claim 9 wherein the energy ray receiver means is a phase sensitive light receiving device.

11. A vehicle washing system having a vehicle conveyor for transporting a vehicle to be cleaned through a plurality of stations in a vehicle cleaning line, said system comprising:

at least one cleaning station along the cleaning line at which a cleaning fluid is applied to the vehicle as part of the cleaning process;

an overhead gantry located along the cleaning line at the cleaning station and under which the vehicle travels when passing through the cleaning station;

a boom mounted to the overhead gantry for pivotal movement about a pivot axis extending in a direction transverse to the cleaning line;

nozzle defining means for dispensing the cleaning fluid mounted on the boom at a point remote from the pivot axis for arcuate movement with the boom and providing a directional discharge of the cleaning fluid toward a passing vehicle;

vehicle contour following means connected with the boom for controlling pivotal movement of the boom and the dispensing nozzle relative to the vehicle surface;

nozzle rotating means connected with the boom and the nozzle for redirecting the directional discharge as the boom and nozzle follow the contour of the passing vehicle;

fluid inlet means near the pivot axis for receiving cleaning fluid from a source of cleaning fluid, and conduit means for carrying the cleaning fluid between the fluid inlet means and the nozzle defining means and being coupled at one end to the fluid inlet means and at its opposite end to the nozzle defining means and having a bow between the inlet means and nozzle defining means to provide physical clearance between the conduit means and the surface of a vehicle entering the cleaning station.

12. A vehicle washing system as defined in claim 1 wherein the nozzle defining means extends substantially across the path of the vehicle through the gantry.

13. Apparatus for following a vehicle surface contour in a vehicle washing system having a cleaning station comprising:

an overhead gantry located at the cleaning station and under which the vehicle travels when passing through the cleaning station;

a boom mounted to the overhead gantry for pivotal movement about a pivot axis extending in a direction transverse to the vehicle travel direction and at the side of the gantry downstream with respect to the vehicle travel direction;

a cleaning element mounted on the boom at a point remote from and in a fixed, spaced relation with the pivot axis for arcuate movement with the boom and providing a directional discharge of cleaning fluid toward a passing vehicle;

means coupled to the boom in the vicinity of the cleaning element for generating an energy beam transverse to the vehicle travel direction;

sensing means for sensing an interruption in the energy beam by the contour of a passing vehicle, and motive means responsive to the beam interruption sensing means for moving the boom and the cleaning element to follow the contour of the passing vehicle.

14. Apparatus for following a vehicle surface contour in a vehicle washing system as defined in claim 13 wherein the means for generating an energy beam includes:

energy ray source means located on one side of the vehicle travel path for transmitting the energy rays across the path, and energy ray receiver means sensitive to the energy rays and located on the other side of the vehicle travel path opposite the energy source for receiving the rays whereby the energy beam is generated between the source means and the receiver means.

15. Apparatus for following a vehicle surface contour in a vehicle washing system as defined in claim 14 wherein the energy source means is an infrared transmitting device and the receiver means is an infrared receiving device.

16. Apparatus for following a vehicle surface contour in a vehicle washing system as defined in claim 14 wherein the energy source means is a light source and the receiver means is a photoconductive device.

17. Apparatus for following a vehicle surface contour is a vehicle washing system as defined in claim 14 wherein the energy source means is a light modulated transmitting device and the receiver is a phase sensitive light receiving device.

* * * * *